US008929938B2

United States Patent
Koren et al.

(10) Patent No.: US 8,929,938 B2
(45) Date of Patent: Jan. 6, 2015

(54) USING A PUSH TO TALK OVER CELLULAR INFRASTRUCTURE FOR RADIO COMMUNICATIONS

(75) Inventors: Eitan Koren, Raanana (IL); Galina Korkhin, Ramat Gan (IL); Mark Shahaf, Vernon Hill, IL (US); Abraham Tooba, Rishon Lezion (IL)

(73) Assignee: Motorola Solutions, Inc., Schaumburg, IL (US)

(*) Notice: Subject to any disclaimer, the term of this patent is extended or adjusted under 35 U.S.C. 154(b) by 622 days.

(21) Appl. No.: 13/190,768

(22) Filed: Jul. 26, 2011

(65) Prior Publication Data
US 2013/0029714 A1   Jan. 31, 2013

(51) Int. Cl.
*H04B 7/00* (2006.01)
*H04W 4/10* (2009.01)

(52) U.S. Cl.
CPC ........................................ *H04W 4/10* (2013.01)
USPC ........ 455/518; 455/519; 455/416; 455/422.1; 455/41.2; 455/3.05; 455/90.2; 379/202.01; 709/204

(58) Field of Classification Search
USPC ............. 455/518, 519, 416, 418, 422.1, 41.2, 455/3.05, 90.2, 67.13; 370/260, 261, 270, 370/276, 310, 352; 379/202.01, 88.19; 709/203, 204
See application file for complete search history.

(56) References Cited

U.S. PATENT DOCUMENTS

| | | | |
|---|---|---|---|
| 7,054,302 B2 | 5/2006 | Albal et al. | |
| 7,764,971 B2 | 7/2010 | Chu et al. | |
| 7,774,012 B2 | 8/2010 | Chowdhury et al. | |
| 2004/0133683 A1 | 7/2004 | Keller et al. | |
| 2007/0097886 A1* | 5/2007 | Schwagmann et al. | 370/260 |
| 2007/0100941 A1 | 5/2007 | Lee et al. | |
| 2008/0076403 A1 | 3/2008 | Park et al. | |
| 2009/0005100 A1* | 1/2009 | Copeland | 455/518 |

FOREIGN PATENT DOCUMENTS

WO    2009052859 A1   4/2009

OTHER PUBLICATIONS

International Search Report and Written Opinion for International Patent Application No. PCT/US2012/046566 mailed Apr. 16, 2013.

* cited by examiner

*Primary Examiner* — Shaima Q Aminzay
(74) *Attorney, Agent, or Firm* — Steven A. May (57) ABSTRACT

At least one subscriber unit (SU) (110) can register with a radio frequency (RF) site (120) for radio services. For each registered SU, a SU push to talk over cellular (PoC) client (342-346) can be activated/established. Communications can be mapped at the RF Site (120) between each registered SU (110) and a corresponding SU PoC client (342-346). Each SU PoC client (342-346) at the RF site (120) can be communicatively linked to a remotely located PoC server (132) using a PoC interface (226). The SU PoC client (342-346) is a communication endpoint of the PoC server (132). In one embodiment, a talkgroup PoC client (350-352) can be established at the RF site (120) that is linked to the PoC server (132). Radio communications to and from the SU (110) can be routed through the SU PoC client (342-346) and/or the talkgroup PoC client (350-352) and through the PoC server (132).

16 Claims, 8 Drawing Sheets

USING A PUSH TO TALK OVER CELLULAR INFRASTRUCTURE FOR RADIO COMMUNICATIONS

FIELD OF THE INVENTION

The invention generally relates to radio communications.

BACKGROUND

To meet the growing demands of public safety digital radio communications, the federal communication commission (FCC) at the directive of the Congress initiated an inquiry in 1988, to receive recommendations from users and manufacturers to improve the communication systems in existence. Based on the recommendations, in October of 1989 the Association of Public-Safety Communications Officials-International (APCO) Project 25, referred to as P25 and/or APCO-25) came into existence.

Project 25 refers to a suite of standards for digital radio communications for use by federal, state/province and local public safety agencies in North America to enable them to communicate with other agencies and mutual aid response teams in emergencies. In this regard, P25 fills the same role as the European Terrestrial Trunked Radio (TETRA) protocol, although not interoperable with it. The Project 25 defines a radio frequency sub-system (RFSS) as "the smallest portion of infrastructure bounded by the standard APCO interfaces". The RFSS is expected to provide a set of services (as defined by the APCO standard) across some portion of the system coverage area with an acceptable grade of service. That is, it supports common-air-interface (CAI) and contains all the logic and controlling elements that support call processing and the various APCO open interfaces. The APCO standard for Project 25 allows each equipment vender to design their own solution for an RFSS implementation, as long as the above definition is met.

BRIEF SUMMARY

In one embodiment of the disclosure, at least one subscriber unit (SU) can register with a radio frequency (RF) site for radio services. The SUs can wirelessly communicate with the RF site over a common air interface (CAI). For each registered subscriber unit, a SU push to talk over cellular (PoC) client can be activated/established. Communications can be mapped at the RF Site between each registered SU and a corresponding SU PoC client, such that communications and commands are conveyed from the SU to the corresponding SU PoC client and such that communications and commands are conveyed from the SU PoC client to the corresponding SU. Each SU PoC client at the RF site can be communicatively linked to a remotely located PoC server using a PoC interface. The SU PoC client is a communication endpoint of the PoC server. Radio communications to and from the SU can be routed through the SU PoC client and through the PoC server.

One embodiment of the disclosure is for a radio frequency sub-system (RFSS) comprising hardware, software, and firmware components forming a smallest portion of a communication infrastructure bounded by standardized Association of Public-Safety Communications Officials-International (APCO) interfaces. The RFSS can include a PoC server and a resource manager. The PoC server can include hardware and software that provides PoC services to a set of mobile telephony devices over a data service of mobile telephony network. The PoC server can enable radio services. The radio services can be conducted over a common air interface and can involve a set of subscriber units (SUs). Each subscriber unit (SU) in the set of SUs can be mapped to a unique communication endpoint of the PoC server. The resource manager can manage and enforce resource policies for radio services provided by the radio frequency sub-system (RFSS). The resource policies can include talkgroup priority, subscriber unit credentials, and system policies. The resource manager can include a user interface that enables system operators to provision the resource policies for the radio services.

One embodiment of the disclosure is for a radio frequency site comprising hardware and software components for trunking and repeating radio services involving a set of trunked subscriber units, which communicate with the radio frequency site over a common air interface (CAI). The radio frequency site can include a PoC interworking gateway (IW-GW) and a site controller. The PoC IW-GW can interface between PoC protocols of a PoC server and protocols used for the radio services. The PoC IW-GW can be linked to traffic channels of the radio frequency site. The site controller can be communicatively linked to a control channel of the radio frequency site and can be communicatively linked to the PoC IW-GW.

DETAILED DESCRIPTION OF THE INVENTION

An embodiment of the disclosure establishes a communication system, which satisfies Project 25 requirements, using PUSH-TO-TALK (PTT) OVER CELLULAR (PoC) components, a central radio frequency (RF) resource management server, and a PoC interworking gateway (PoC IW-GW).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
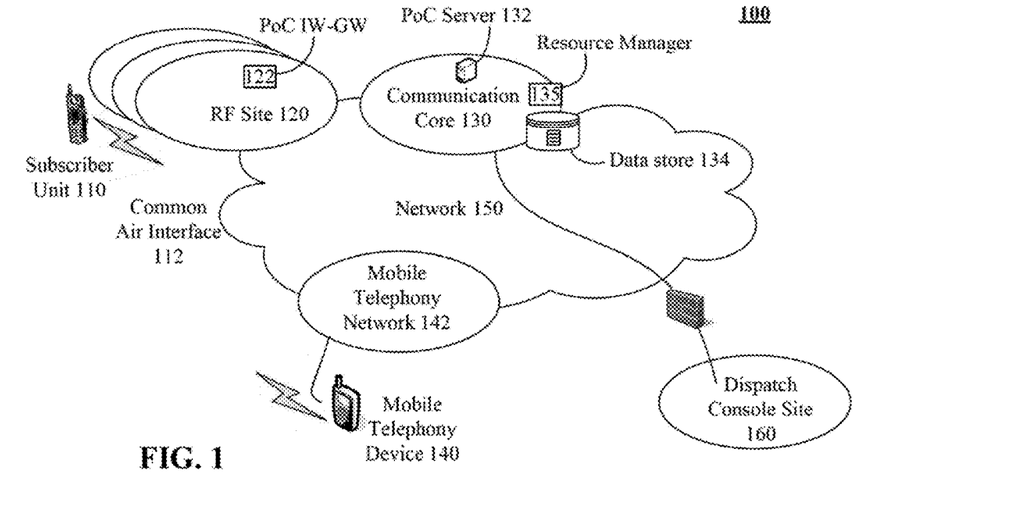
FIG. 1 shows a system (or architecture) for a communication core of a network that supports communications involving subscriber units and mobile telephony devices in accordance with an embodiment of the disclosure.

FIG. 1 shows a system (or architecture) 100 for a communication core 130 of a network 150 that supports communications involving subscriber units 110 and mobile telephony devices 140 in accordance with an embodiment of the disclosure. Each subscriber unit 110 can be a radio that communicates using a common air interface (CAI) 112 within a radio frequency (RF) range of an RF site 120. The mobile telephony devices 140 can be broadband devices that communicate via a mobile telephony network 142. A dispatch console site 160 can dispatch calls to both the subscriber units 110 and the mobile telephony devices 140. The communication core 130 can facilitate communications in accordance with resource policies (stored in data store 134) established for the subscriber units 110.

That is, the communication core 130 can perform radio frequency subsystem (RFSS) functions in addition to performing push-to-talk (PTT) over cellular (PoC) functions via PoC server 132. In this sense, the communications core 130 can be considered a unified core, as it supports broadband (e.g., mobile telephony 142) subscribers (using a mobile telephony device 140) as well as supporting narrowband radio communications with subscriber units 110.

In one embodiment, the communication core 130 can include a resource manager 135 that facilitates communications between the RF site 120 and the PoC server 132 to provide RF functionality. For example, the resource manager 135 can be provisioned by system operators with relevant RF resource policies for the communication core 130 (i.e., the RFSS functions). The resource policies can include talkgroup priority, subscriber unit credentials, system policies, and the like.

In one embodiment, the RF site 120 can include a PoC interworking (IW) Gateway (GW) 122. The IW-GW 122 can be a communication node for interfacing with different protocols than the two-way radio protocols of the RF site 120. The IW-GW 122 can function as a protocol converter, which is able to operate at a network layer of the OSI or TCP/IP model.

The components (110, 120, 130, 140, 160) of system 100 can comply with Project 25 standards (or with similar or derivative sets of interoperability standards). Project 25 can refer to a suite of standards for digital radio communications for use by federal, state/providence, and local public safety agencies in North America. Compliance with the Project 25 standard ensures that different subscriber units 110, RF sites 120, dispatch consoles 160, and network cores 130 can interoperate. That is, regardless of equipment vender or underlying technologies used to implement a radio communications, so long as equipment conforms to the Project 25 standards it should be interoperable.

More specifically, Project 25 specifies eight open interfaces between various components of a radio system. These interfaces include (1) common air interface; (2) subscriber data peripheral interface, (3) fixed station interface; (4) console subsystem interface; (5) network management interface, (6) data network interface, (7) telephone interconnect interface, and (8) inter RF subsystem interface (ISSI).

According to Project 25, the (1) common air interface represented in system 100 as CAI 112, can specify a type and content of signals transmitted by compliant radios (e.g., subscriber units 110). The (2) Subscriber Data Peripheral Interface is a standard that specifies a port through which mobiles and portables can connect to laptops or data networks. (3) Fixed Station Interfaces specify a set of mandatory messages supporting digital voice, data, encryption and telephone interconnect necessary for communication between a Fixed Station and Project 25 radio frequency (RF) Subsystem. (4) The Console Subsystem Interface specifies the basic messaging to interface a console subsystem to a Project 25 RF Subsystem. (5) Network Management Interface specifies a single network management scheme which will allow all network elements of the RF subsystem to be managed. (6) Data Network Interface specifies the RF Subsystem's connections to computers, data networks, or external data sources. (7) Telephone Interconnect Interface specifies the interface to Public Switched Telephone Network (PSTN) supporting both analog and ISDN telephone interfaces. (8) ISSI specifies the interface between RF subsystems which will allow them to be connected into wide area networks The Project 25 standards permit each equipment vender to provide their own solution for an RFSS implementation, so long as it satisfies interface requirements of the above. Communication core 130 preforms the RFSS functions in system 100. Thus, the communication core 130 can be considered "the smallest portion of infrastructure bounded by standard APCO (Project 25) interfaces."

The subscriber units 110 can be a device capable of participating in dispatch calls in a trunked (or non-trunked) radio communication system. Each subscriber unit 110 in a range can have a radio or individual ID, which allows a controller (e.g., RF site 120) to accept or reject users based on its subscriber access control database. Subscriber units 110 can support private dispatch calls, talkgroup calls, multigroup calls, and the like.

Figure 3:
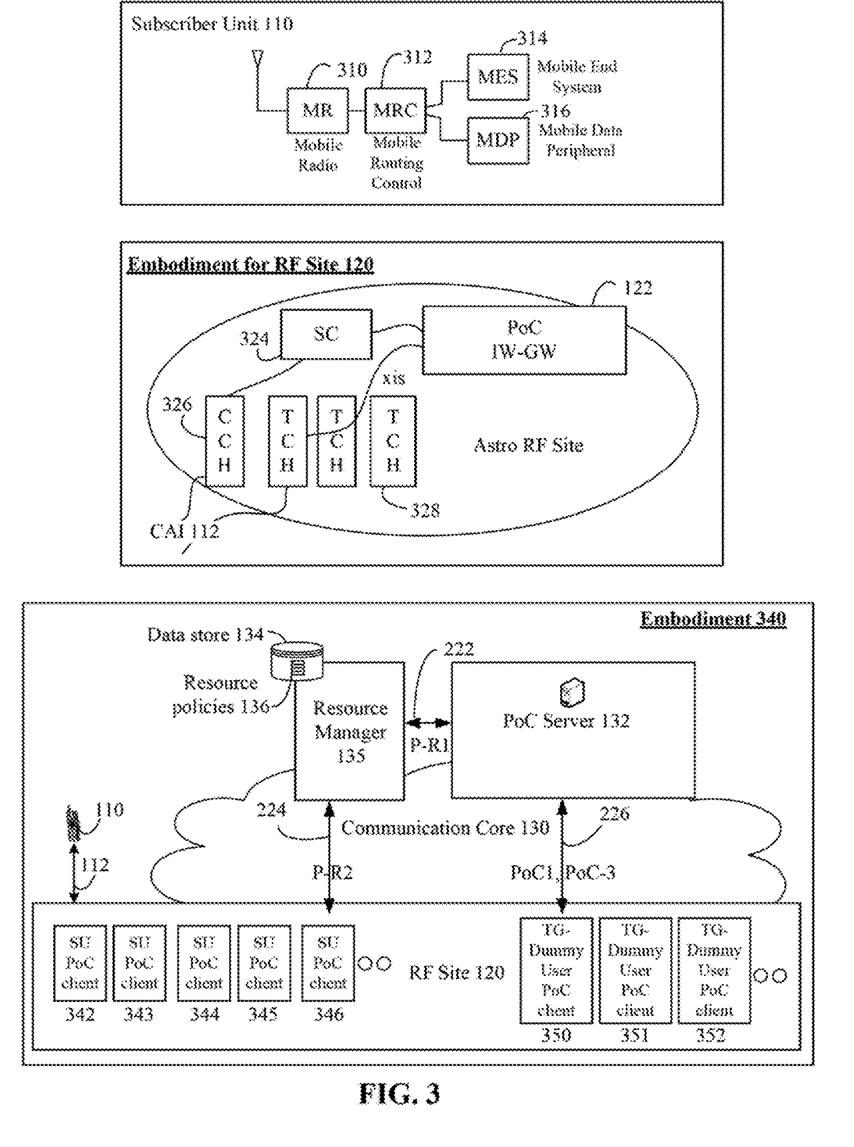
FIG. 3 shows an RF site with established PoC clients, and an embodiment of a communication system in accordance with embodiments of the disclosure.

To elaborate, each subscriber unit 110 can be a radio able to transmit and receive. The subscriber unit 110 can be a half-duplex (or simplex) device that permits communications in both directions, but not simultaneously. Subscriber units 110 can include mobile units, had-held units, and units having a stationary base. Subscriber units 110 can include a push-to-talk or press to transmit button, which often activates a transmitter of the subscriber unit 110. FIG. 3 shows an embodiment of a subscriber unit 110, which shows each unit 110, can be represented as a mobile radio 310 having a circuitry for mobile routing and control 312. Some subscriber units 110 can permit a selective attachment/detachment of mobile data peripherals 316. Additionally the subscriber unit 110 can include circuitry for a mobile end system (MES) 314.

Referring back to FIG. 1, the common air interface (CAI) 112 refers to the APCO specified standard for digital voice modulation. Using the CAI 112 any subscriber unit 110 should be able to communicate with any other CAI 112 compliant subscriber unit 110, regardless of what manufacturer produced the radio. More specifically, CAI 112 uses a method of digitized voice called Improved Multi-Band Excitation (IMBE). The IMBE voice encoder-decoder (vocoder) samples the audio input at the microphone and produces a digital stream that represents the sound, this digital stream is then transmitted. The receiver sends this digital stream to the vocoder in its radio and it is used to produce a synthetic equivalent of the input sound. Appreciably, the CAI 112 specifies a digital voice (e.g., modulation) type, which is able to be used on conventional simplex or repeater radio systems or in a trunking radio system. Project 25 specifies that only digital modulation is used (e.g., no analog is allowed).

A dispatch control site 160 can have a dispatch console that a dispatcher uses to access talkgroups on a network. Consoles can monitor multiple talkgroups concurrently. A dispatch console can also connect subscriber units 110 to additional equipment, such as resources of an Internet Protocol (IP) network 150. Via the dispatch console, dispatchers are able to issue commands, such as patching of talkgroups, private calling subscribers, issuing a temporarily broadcast to multiple talkgroups called a MultiSelect, dynamically regrouping radios, and other various administrative commands.

The RF site 120 can be a communication intermediary between a set of subscriber units 110 within an RF range and the communication core 130. The RF site 120 can function as a trunking and repeater site. More specifically, the RF site 120 can be a PoC server enabled Project 25 compliant trunking site. One embodiment of RF site 120 is shown in FIG. 3. As shown, a control channel 326 and a set of traffic channels 328 are used to communicate over air in accordance with the CAI 112. Additionally in the embodiment, a site controller 324 can communicate with the PoC IW-GW gateway 122 and with the control channel 326.

Referring back to FIG. 1, the mobile telephony device 140 can be an electronic device used to make mobile telephone calls, to access the internet, send data, etc. via the mobile telephony network 142. The mobile telephony device 140 can be full-duplex device able to concurrently send and receive voice/data in both directions concurrently.

The mobile telephony network 142 is a network of nodes or cells. The mobile telephony network 142 can include 2G, 3G, and 4G (including long term evolution or LTE, WiMAX technologies, etc.) networks. 3G and 4G networks are often considered broadband networks. Any of a number of different digital cellular technologies can be used for the network 142 including, but not limited to, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, and the like.

The mobile telephony device 140 and mobile telephony network 142 can support Push to Talk over Cellular (PoC) services. These PoC services can be managed/facilitated by PoC server 132. PoC services provide an option for the mobile telephony network 142 that permits subscribers to use their phone as a walkie-talkie with unlimited range. A typical Push to Talk (PTT) connection connects almost instantly. One significant advantage of PoC/PTT is that it allows a single person to reach an active talkgroup with a single button press; users need not make several calls to coordinate with a group.

It should be appreciated that typically (in conventional architectures) PoC services are supported only between parties on the same mobile carrier service, and users with different carriers will be unable to transmit to each other by PTT. In system 100, the PoC server 132 (as coupled to resource manager 135) can interoperate with any Project 25 compliant subscriber unit 110. Thus, two different systems implementing Project 25 PoC services can interoperate with each other, using the Project 25 standards to guarantee interoperability.

Network 150 can represent a set of different networks that interoperate. The network 150 can include an IP network, the internet, a set of private networks, the public switched telephony network (PSTN), and the like. Multiple different radio networks (each having their own RFSS) can be included in the network 150, which are able to interoperate with each other via common interfaces, such as those established by the Project 25 standards.

Figure 2:
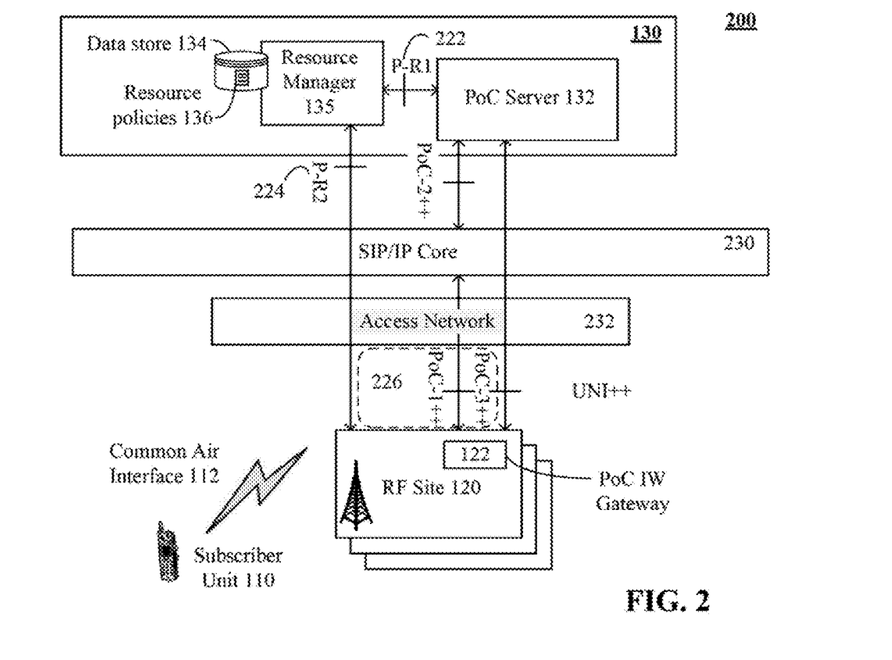
FIG. 2 shows a system having a communication core that includes resource manager as well as PoC server in accordance with an embodiment of the disclosure.

FIG. 2 shows a system 200 having a communication core 130 that includes resource manager 135 as well as PoC server 132. Typically, PoC technology (which was designed as an overlay over an IP-based wireline or wireless system) does not include RF resource management functions. The communication core 130 communicates with a SIP/IP core 230 and an access network 232, as shown. More specifically, the PoC server 132 can communicate with the PoC IW-GW 122 of RF site 120

In system 200, the RF resource management functions are provided by resource manager 135. In one embodiment, the RF site 120 and the resource manager 135 can be for dispatch calls of a trunked radio system. That is, a talkgroup affiliation can be transmitted on a control channel in a central-controlled trunk system (no control channel will exist for an embodiment for a scan based trunked system). The talkgroup affiliation can identify a specific radio to a site controller (SC) as a member of a specific talkgroup. Logic Trunked Radio (LTR), SmarTrunk, Terrestrial Trunked Radio (TETRA), Integrated Digital Enhanced Network (iDEN), MOTOROLA Type 1 and Type 2, MOTOTRBO (ETSI Digital Mobile Radio tier 2 standard for professional two-way radio users), and the like are examples of the types of trunking, any of which can be used in conjunction with the disclosure. In another embodiment, the RF site 120 can supported non-trunked radio system communications.

The resource manager 135 can be provisioned by system operators with relevant RF resource policies 136 for the communication core 130 (e.g., the RFSS functions of the core 130). The policies 136 can include talkgroup priority, subscriber unit credentials, system policies, and the like. The resource manager 135 can communicate with the RF site 120 using a P-R2 interface 224. The resource manager 135 can communicate with the PoC server 132 using P-R1 interface 222.

The P-R1 interface 222 can be a proprietary or standardized interface for allowing the PoC server 132 to inform the resource manager 135 on new call requests (Group or Private) being processed by the PoC server 132. Interface 222 can be essential as some incoming calls may arrive from the broadband domain (e.g., the mobile telephony network 142).

The P-R2 interface 224 can be a proprietary or standardized interface for allowing the resource manager 135 to enforce the system policy (i.e. prioritize calls at an RF site 120 that reached its RF resources limit) by interaction with the RF sites 120.

PoC communications (which can be in UNI++ format) to between the PoC Server 132 and the RF site 120 can be handled by a PoC interworking (IW) Gateway (GW) 122. In one embodiment, the UNI++ interface is an extension of the OMA-PoC UNI interface that allows the RTP media streams to use P25 voice payloads as defined by TIA.102.BAHA paragraph 8.51 and 8.4.2. TIA refers to the TELECOMMUNICATIONS INDUSTRY ASSOCIATION. TIA-102.BAHA refers to a specific revision of Project 25 standards for the "New Technology Standards Project—Digital Radio Technical Standards".

Embodiment 340 of FIG. 3 shows RF site 120 that communicates with the resource manager 135 and PoC server 132 of the communication core 130. Each subscriber unit 110 that is registered with the RF site 120 has a corresponding SU PoC client 342-346 established. Thus, an endpoint can be established with the PoC server 132 for each PoC client 342-346. Additionally, a number of talkgroup user PoC clients 350-352 can be established within the RF site 120. Each talkgroup user PoC client 350-352 can represent a talkgroup in the site. Thus, a single endpoint of the PoC server 132 can correspond to each unique talkgroup.

Figure 4:
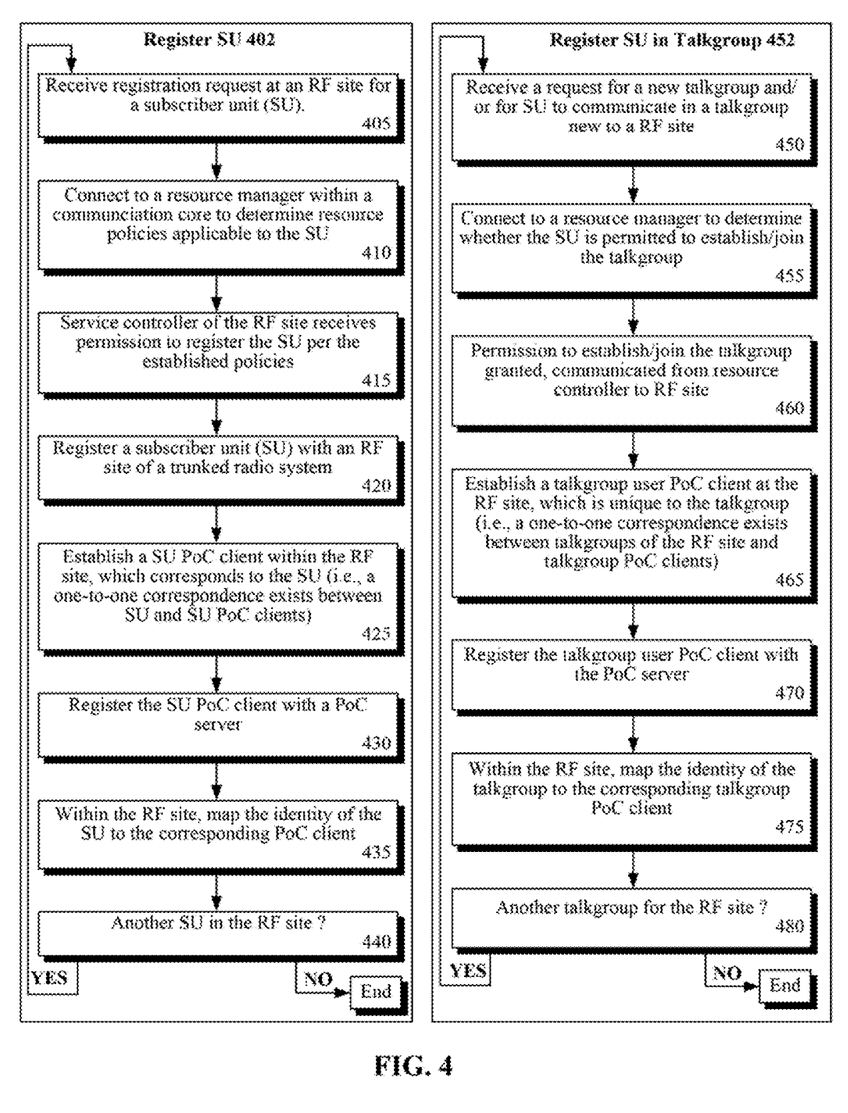
FIG. 4 shows a process for registering a subscriber unit (SU) within a communication system in accordance with an embodiment of the disclosure.

FIG. 4 shows a process 402 for registering a subscriber unit (SU) within a communication system, such as system 100, 200, which is consistent with embodiment 340. Process 402 can begin in step 405, where a registration request is received at an RF site for registering a SU. In step 410, the RF site can connect to a resource manager (e.g., resource manager 135 of a communication core 130) to determine resource policies applicable to the SU. If the resource manager is to grant permission to the SU, it can record its presence in management tables, along with any relevant resource policies applicable to the SU. In step 415, the site controller of the RF site can receive permission from the resource manager to register the SU per the established policies. In one embodiment, the resource manager can deny registration to the SU, in which case it is not registered with the RF site and the process 402 can end.

In step 420, the SU can be registered with the RF site, consistent with the permissions received from the resource manager. In step 425, a SU PoC client can be established within the RF site, which corresponds to the SU. In one embodiment, a one-to-one correspondence can be maintained between unique SUs registered with the RF site and SU PoC clients of the RF site. Thus, when a SU disconnects or de-registers from the RF Site, the corresponding SU PoC client can be disabled and/or deleted. In step 430, the SU PoC client can be registered with a PoC server, as a unique endpoint (effectively the SU PoC client is assigned a virtual identity that uniquely identifies it as a PoC server end-device). Within the RF site, an identity of the SU (e.g., the unique ID of the SU) can be mapped to the corresponding SU PoC client, as shown by step 435. This mapping can be used to direct communications from the SU to the SU PoC client and to direct communications from the SU PoC client to the SU. If additional SU are to be added to the RF site, the method can proceed from step 440 to step 405. Otherwise, the process can check (not shown) to see if any SUs have been disconnected from the RF server, in which case corresponding messages can be sent to the resource manager and an associated SU PoC client can be disabled/deleted.

FIG. 4 also shows process 452 for registering a talkgroup within a communication system, such as system 100, 200, which is consistent with embodiment 340. Process 452 can begin in step 450, where a request to establish a new talkgroup (talkgroup that is not currently active for the RF site, which means that no SU in the RF site is a member of the talkgroup up until now) and/or to join an existing talkgroup can be received. In step 455, the RF site can connect to the resource manager to determine whether or not the SU is permitted to establish/join the talkgroup. If so, the records of the resource manager can be updated accordingly. Then the resource manager can grant permission by sending a message to the RF site, as shown by step 460. If the SU is not permitted to establish/join the talkgroup, a suitable message can be conveyed to this effect (not shown), and the process 452 can end.

In step 465, a talkgroup user PoC client can be established at the RF site that is unique to the talkgroup. In one embodiment, a one-to-one correspondence can be established between talkgroups of the RF site and talkgroup PoC clients. In step 470, the talkgroup user PoC client can be registered as a communication end-point with the PoC server. In step 475, a unique identity of the talkgroup can be mapped to the talkgroup PoC client. Thus, only one endpoint registered within the PoC server is needed per talkgroup and RF site.

When another talkgroup is needed for the RF site, the process 452 can progress from step 480 to step 450. If no SU registered within the RF site is no longer a member of a talkgroup, the talkgroup PoC client of the RF site can be deactivated/deleted.

Figure 5:
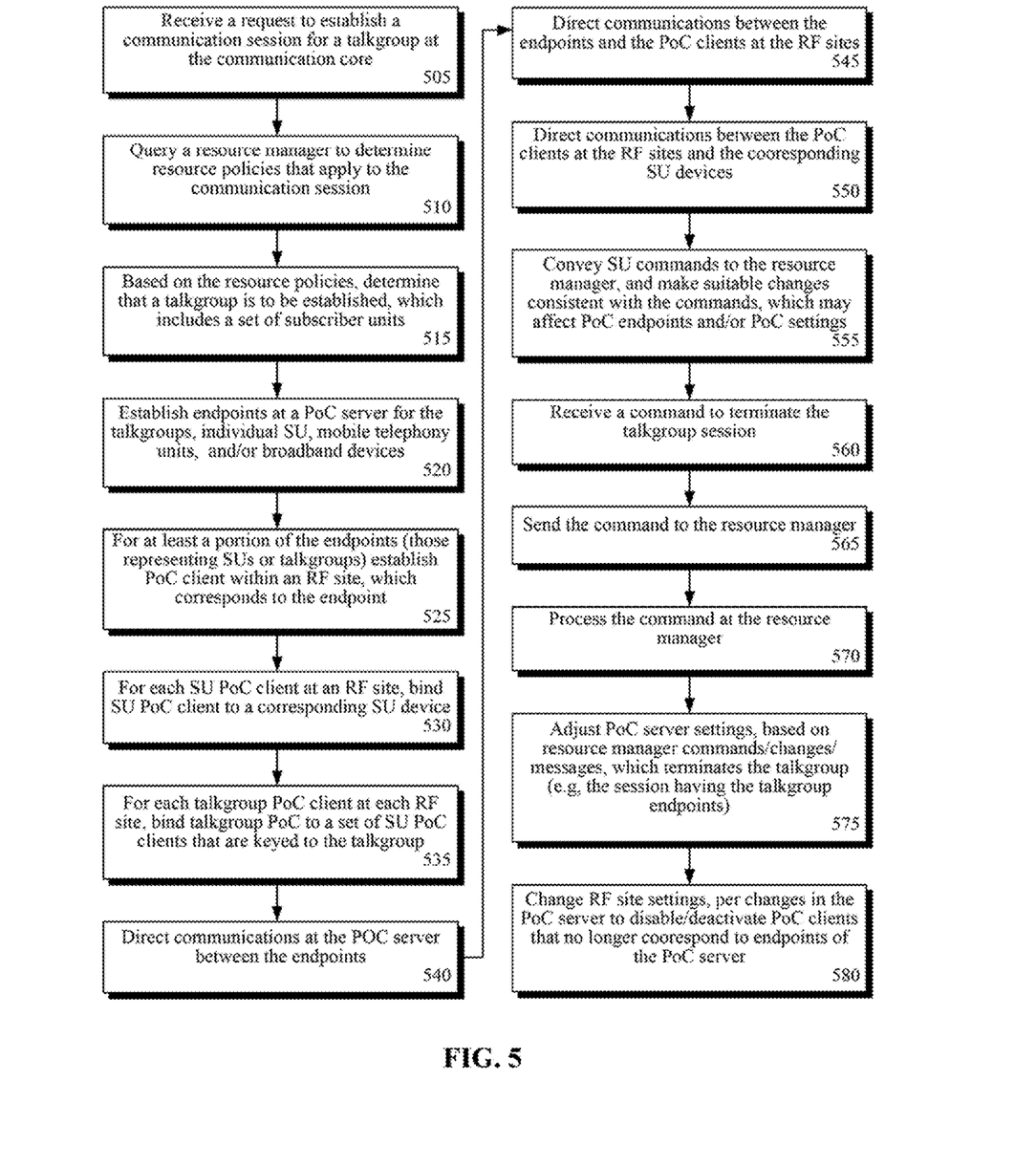
FIG. 5 shows a process for dispatch communications in a system that uses a PoC server in a communication core in accordance with an embodiment of the disclosure.

FIG. 5 shows a process 500 for dispatch communications in a system that uses a PoC server in a communication core in accordance with an embodiment of the disclosure. The communication system can be consistent with arrangements of system 100, 200, embodiment 340, and the like.

Process 500 can begin in step 505, where a request to establish a communication session for a talkgroup can be received at a communication core. In step 510, the resource manager can be queried to determine resource policies that apply to the talkgroup, which can also be considered a communication session that is to be maintained by the PoC server. In step 515, a determination can be made regarding whether the talkgroup is to be established. The resource manager can also determine a set of subscriber units (SU) that are members of the talkgroup. In step 520, endpoints can be established at the PoC server for the talkgroup and/or individual SU that participate in the talkgroup, mobile telephony units, broadband devices, and the like. That is, various types of equipment can participate in a talkgroup. This equipment can include equipment connected to the PoC server via an IP network, as well as radio equipment connected to an RF site via a CAI.

In step 525, for at least a portion of the endpoints (of the PoC server), PoC clients can be established within a suitable RF site. The PoC clients can correspond to a specific talkgroup and/or SU. The RF sites can be sites to which the SU is registered and/or which participate in the talkgroup. In step 530, each SU PoC client of an RF site can be bound to a corresponding SU device. In step 535, for each talkgroup PoC client, a set of SU PoC clients that are keyed to this talkgroup can be bound. This allows each RF site to have a single PoC endpoint associated with a talkgroup, regardless of how many SU devices of the RF site are participants of the talkgroup.

Direct communications can occur at the PoC server between the endpoints, as shown by step 540. Direct communications can also occur between the endpoints and the PoC clients at the RF sites, as shown by step 545. Additionally, in step 550, direct communications can occur between PoC clients at the RF site and corresponding SU devices. Since PoC endpoints are used for all communications, the process can add POTS, IP devices, and the like to communications (such as Project 25 compliant ones) using standard PoC techniques.

Step 555 shows that SU issued commands (or commands from a dispatch console) can be conveyed (through the PoC endpoints) to the resource manager of a communication core. Suitable changes can be made within the resource manager consistent with the received commands. These commands and resulting changes may affect PoC endpoints and/or settings of the PoC server. A command to terminate a talkgroup session can be conveyed, as shown by step 560, from an authorized end-user and/or by a programmatic event (i.e., no members are using a talkgroup, allowing it to be discarded/disabled/deleted). The command can be sent to the resource manager in step 565. In step 570, the resource manager can process the command.

In step 575, the resource manager can send information (e.g., commands, changes, messages to the PoC server, which results in PoC server settings being adjusted to terminate the talkgroup. That is, the PoC server terminates a session having a set of endpoints, which correspond to the talkgroup. In step 580, RF site settings can be changed as appropriate given the changes in the PoC server. For example, PoC clients that are no longer required (because corresponding PoC server endpoints have been terminated) can be deactivated or disabled.

Figure 6:
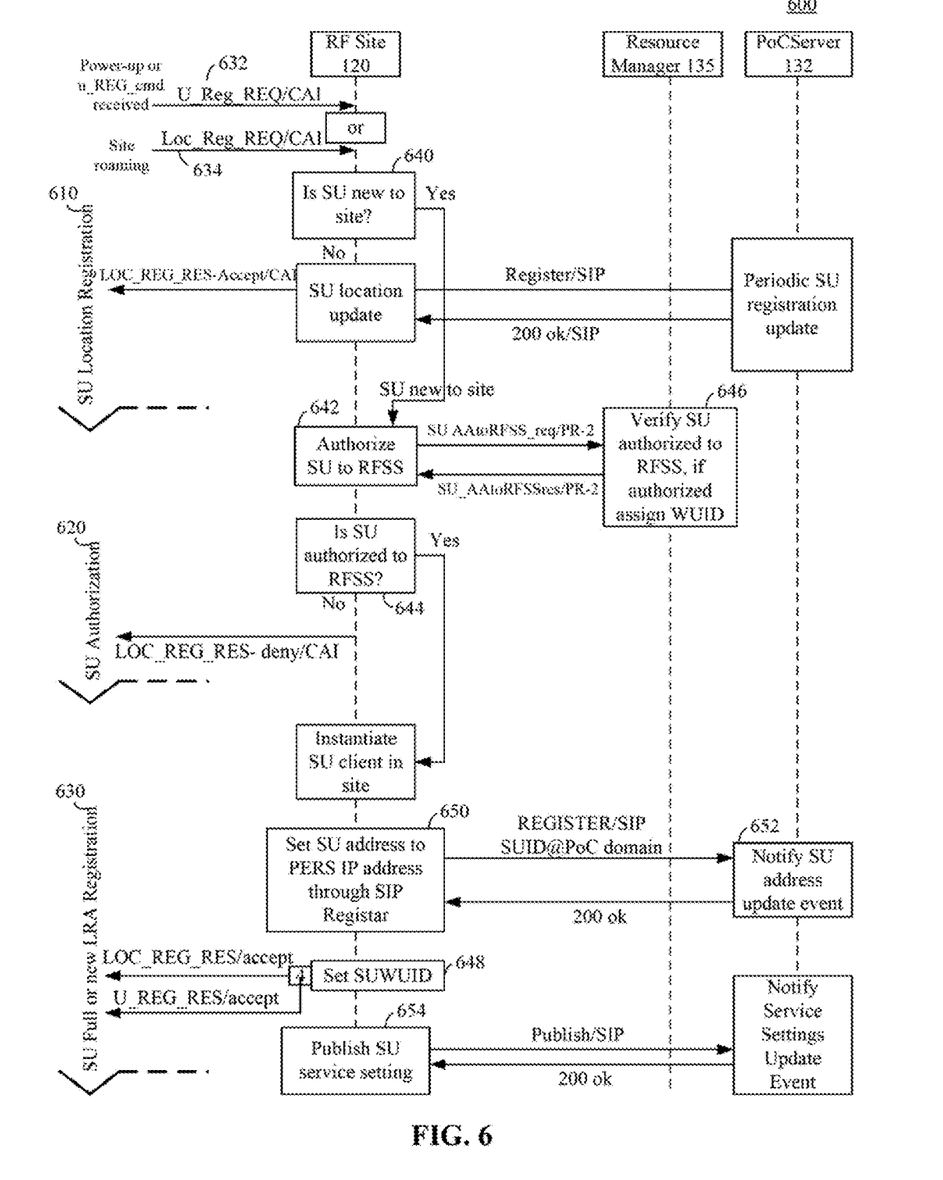
FIG. 6 shows a flow diagram of SU registration and authorization in accordance with an embodiment of the disclosure.

FIG. 6 shows a flow diagram 600 of SU registration and authorization in accordance with an embodiment of the disclosure. Diagram 600 is consistent with processes 402 and 452 of FIG. 4. More specifically, Project 25 compliant SU full registration 630 can be triggered by SU power up (see 632), can be forced with a command received from the RF site (see 632) can be periodically driven by the system, and the like. SU location registration 610 can be triggered upon a SU roaming (see 634) to a new RF site. Authorization 620 represents steps taken by a communication core (specifically a resource manager 135).

Project 25 SU registration to communication core can occur through the following in one embodiment of the disclosure:

(i) Upon "new" P25-SU registration to the RF site 120 (see 640), the RF site 120 will send SU-authorization request (see 642) to the resource manager 135 for SU authorization to the system (over P-R2 interface)

(ii) The RF site 120 will accept/deny the SU service based on resource manager authorization response (see 644).

(iii) During SU authorization 620, the resource manager 135 will assign authorized SU a unique WUID for SU reference through CAI (see 646). The resource manager 135 can guarantee same WUID allocation for the SU through all registrations within communication core.

(iv) The RF site 120 can save allocated WUID per SU in a local SUID-to-WUID mapping table (see 648).

(v) The RF site 120 will SIP register authorized SU to the PoC server (over PoC 1-standard SIP interface), by SU SIP URI: SUID@PoC-domain; where SUID is derived from the provisioned SU SUID. (see 650 and 652)

(vi) Upon successful SIP Registration to PoC server PERS will instantiate a local SU-client for handling U2U calls (see 650, 652).

(vii) SU-Client will update PoC server with P25-service setting through standard SIP: Publish (see 654).

In regards to (iii), per Project 25 TIA-102.AABD-A standards:

WUID=unit-id field of the SUID, for SU within PERS Registration Area;

WUID=unique 24 bits id from allocate visitors range, for SU outside PERS Registration Area.

In regards to (v), per Project 25 standards: SUID=wacn-id|system-id|u-id. Per ISSI standards, SU' SIP URI can be uniquely derived from P25 SUID as follows:

Wacn-id is expressed as five hexadecimal characters derived from the 20 bits WACN ID of the referenced object SUID System-id is expressed as three hexadecimal characters derived from 12 bits system id of the referenced object SUID Unit-id is expressed as 6Hex-characters derived from 24 bits u-id of the referenced object SUID Embodiments of the disclosure utilize the ISSI method for a radical name of the URI.

In regards to (vi), a SU client can support standard PoC SU-client, and in addition:

SU client will monitor SU presence

SU client will periodically Register SU with SIP. When SU disconnects from site, SU client will (i) de-Register SU from SIP and (ii) terminate itself (SU-client)

Figure 7:
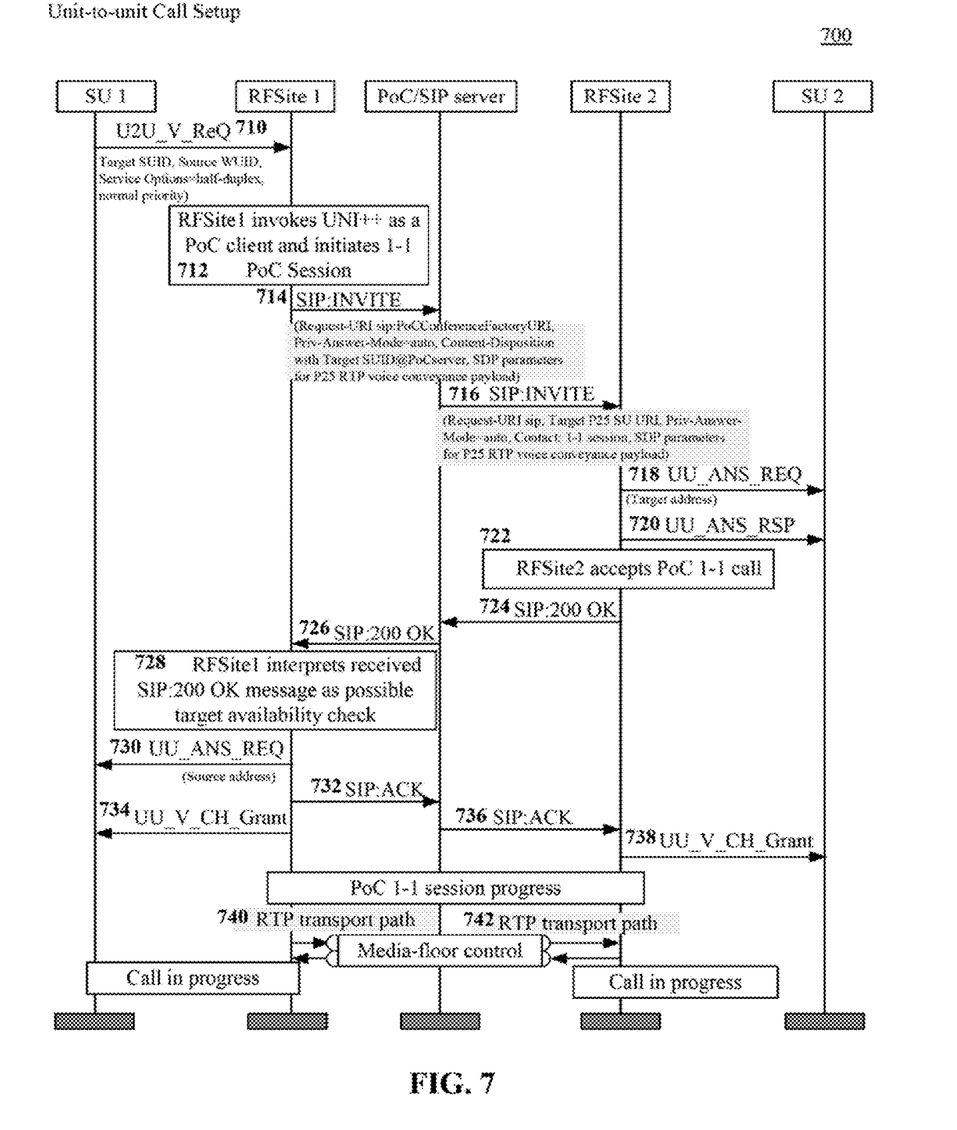
FIG. 7 shows a scenario for a half-duplex unit-to-unit call setup in accordance with an embodiment of the disclosure.

FIG. 7 shows a scenario 700 for a half-duplex unit-to-unit call setup in accordance with an embodiment of the disclosure. In scenario 700, the calling and the called SUs belong to different RF sites (RF Site1 and RF Site2). Each SU is fully registered and authorized in the wide area system.

Step 710 shows a unit-to-unit request message—U2U_V_REQ message—from originating SU1 to RFSite1. For example, when the SU1 user presses PTT to talk with SU2 the RFSite1 receives unit to unit voice call setup request from the SU1 on a control channel.

Step 712 shows RFSite1 invoking UNI++ as a PoC client towards the PoC server, which initiates a one-to-one PoC session.

Step 714 shows a SIP INVITE request from the SU1 PoC client of RFSite1 to the PoC/SIP server. That is, the originating SU1 PoC client of the RFSite1 can generate a SIP: INVITE request towards the PoC server. The following information can reflect original Project 25 unit to unit call information:

Contact contains originating SU URI, (i.e. SU SUID@PoC-domain)
Require is set to "recipient-list-invite"
Priv-Answer-Mode is set to "Auto" to specify unconfirmed service
Content-Disposition contains URI of the called SU as a recipient-list
SDP offer includes: (i) media information as "audio" (ii) session information as "speech", and (iii) media attributes for the RTP Voice Conveyance Payload encoding in accordance with a radio system.

Step 716 shows the SIP: INVITE request from the PoC/SIP server to the SU2 PoC client of RFSite2. The RFSite2 can receive a valid SIP: INVITE request from the PoC/SIP server containing a one-to-one unconfirmed voice session invitation. The invitation can include:

Request-URI contains SIP URI of the target SU belonging to the RF Site2
Priv-Answer-Mode is set to Auto
Contact shows the session identity and session definition as 1-1
SDP parameters reflect RTP Voice media in accordance with a radio system.

Step 718 can include a unit-to-unit answer request (UU_ANS_REQ) from the RFSite2 to the SU2. The RFSite2 can perform an availability check of the target SU2 (if supported) on the control channel.

Step 720 can include a unit-to-unit response (UU_ANS_RSP) from the SU2 to the RFSite2. That is, the RF Site2 can receive a response on availability check from the target SU2 on the control channel.

In step 722, RF Site2 can accept the one-to-one PoC session. The RFSite2 can verify the SDP offer and can accepts the PoC session proposed by the PoC Server.

In step 724, a SIP: 200 OK command can be sent from the SU2 PoC client of the RFSite2 to the PoC/SIP server. The terminating of the SU2 PoC client can send an OK for the one-to-one session to the PoC/SIP server.

In step 726, a SIP: 200 OK command can be sent from the PoC/SIP server to the SU1 PoC client of RFSite1. The originating SU1 PoC client can receive the OK for the PoC session from the PoC/SiP server.

In step 728, the RFSite1 can interpret the SIP: 200 OK message as a target SU2 availability check.

In step 730, a unit-to-unit answer request (UU_ANS_REQ) can be received from the RFSite1 to the source SU1. That is, the RFSite1 can send an outbound UU_ANS_REQ message to the source SU1 on the control channel.

In step 732, a SIP: ACK message can be generated that is from the originating SU1 PoC client of RF Site1 to the PoC/SIP server.

In step 734, a unit-to-unit message (UU_V_CH_GRANT) can be generated that is from the RFSite1 to the source SU1. Thus, the RFSite1 can grant the source SU1 with traffic resources by sending a UU_V_CH_GRANT message on the control channel.

In step 736, a SIP: ACK message can be conveyed from the PoC/SIP server to the terminating SU2 PoC client of RF Site2. Hence, the terminating SU2 PoC client can receives ACK from the PoC/SIP server for established one-to-one session.

Step 738 shows a UU_V_CH_GRANT message from the RFSite2 to the target SU2. The RFSite2 can send the UU_V_CH_GRANT message to the SU2 on the control channel to force the target SU2 to go to the traffic channel for the unit-to-unit voice call.

Step 740 shows the RTP transport path from the SU1 PoC client of RFSite1 to the PoC server. In one embodiment, during the PoC session all TBCP messages and RTP Media packets sent from or destined to the SU1 PoC client of RFSite 1 will be controlled by the PoC Server's media-floor control entity until the PoC session is released. The packets will go between originating RFSite1 and the PoC Server.

Step 742 shows the RTP transport path from the PoC server to the SU2 PoC client of RFSite2. In one embodiment, during the PoC session all TBCP messages and RTP Media packets sent from or destined to the SU2 PoC client of RFSite2 will be controlled by the PoC Server's media-floor control entity until the PoC session is released. The packets will go between the PoC Server and terminating RFSite2.

Figure 8:
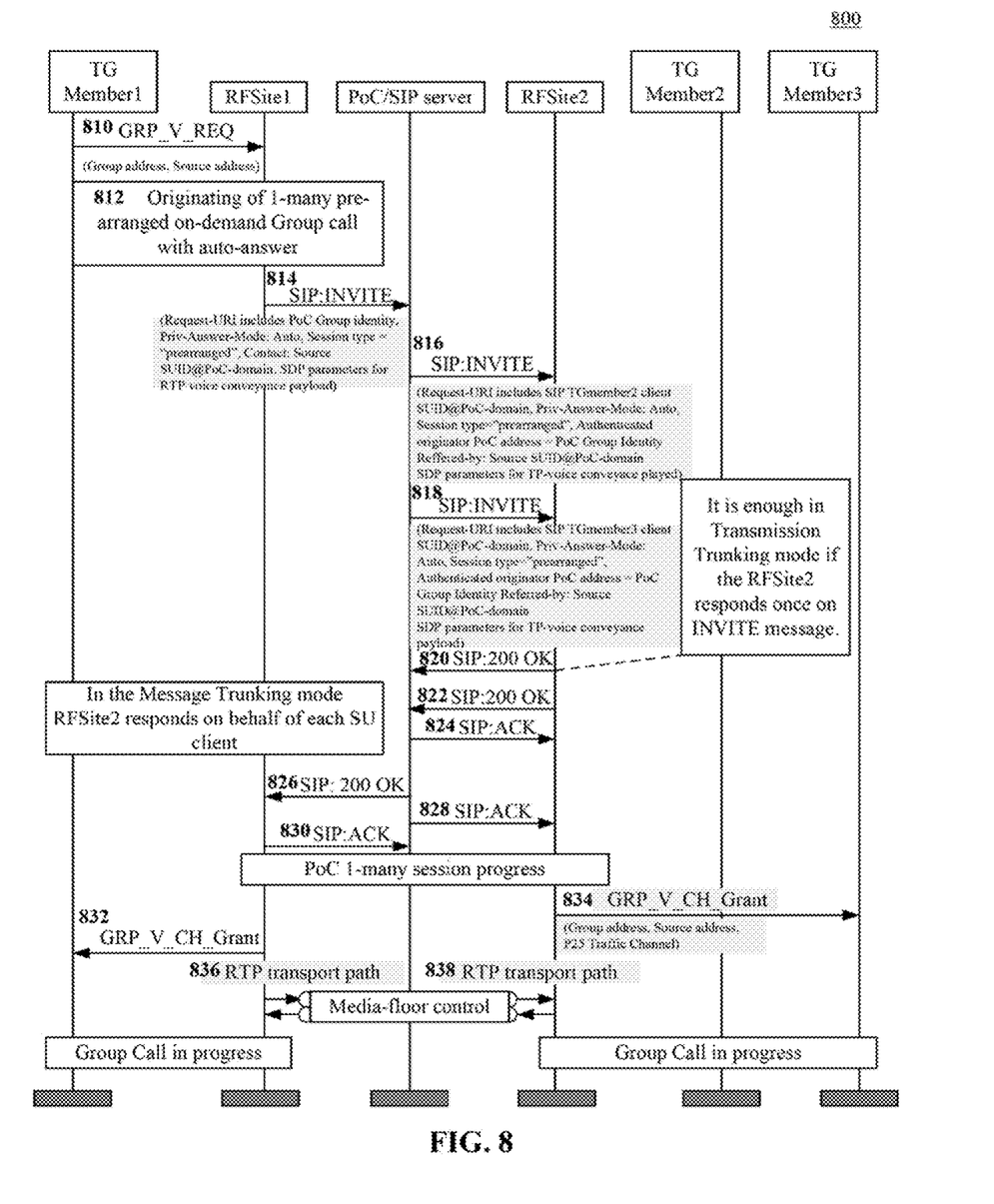
FIG. 8 shows a scenario for a voice group call setup in accordance with an embodiment of the disclosure.

FIG. 8 shows a scenario 800 for a voice group call setup in accordance with an embodiment of the disclosure. In scenario 800, talkgroup members can belong to different RFSites and can communication over one-to-many sessions. The RFSite1 and RFSite2 support PoC pre-arranged on-demand group call. A group call is assumed to be confirmed for both Project 25 radio networks and PoC networks. Scenario 800 assumes that all participating SUs are provisioned (e.g., using their SU SIP URIs) to the talkgroup (using the talkgroup factory SIP URIs) in the PoC server.

Step 810 shows a GRP_V_REQ message from originating P25 talkgroup (TG) Member1 to RFSite1). The RF Site1 receives voice group call setup request from the affiliated TG Member 1 on the control channel.

In step 812, RFSite1 can originate the PoC one-to-many pre-arranged on-demand group call with auto-answer. If GRP_V_REQ is valid the RF Site1 can initiates the PoC one-to-many pre-arranged on-demand session as an originating SU1 PoC client Step 814 shows a SIP: INVITE request from SU1 PoC client of RFSite1 to the PoC/SIP server. The RFSite1 (as originating SU1 PoC client) can generate a SIP: INVITE request towards the PoC server. In one embodiment, information of this request can include:

Request-URI is set to the PoC Group Identity (SGID@PoC-domain) identifying the talkgroup
Session Type uri-parameter set to "session=prearranged"
uriusage set to "group"
Priv-Answer-Mode is set to Auto to specify unconfirmed service
Contact contains originating SUID @PoC-domain
Priv-Answer-Mode is set to "Auto" to specify unconfirmed service
SDP parameters include (i) media information as "audio" (ii) session information as "speech" (iii) media attributes to reflect the RTP Voice Conveyance Payload encoding in accordance with a radio system.

Steps 814 and 816 show a SIP: INVITE request from PoC/SIP server to terminating RFSite2, SU2, and SU3 PoC clients). Upon receiving invitation to the one-to-many group session from the SU1 PoC client of the RFSite1 the PoC server sends SIP INVITE messages to all registered users provisioned with the Pre-arranged group. Thus, the RFSite2 can receive multiple INVITES for the same group call, one per registered SU that has been provisioned to that prearranged group (SU2 and SU3). In one embodiment, the SIP: INVITE message can contain the following parameters:

Request-URI contains a SIP SUID@PoC-domain URI of the SU PoC client corresponding to the TG member 2 or 3 in the RF Site2 whom this request is destined for.

Priv-Answer-Mode is set to Auto

Contact specifies session type set to "session=prearranged"

Authenticated originator PoC address contains PoC Group identity (SGID@PoC-domain)

Referred-by specifies originating SU1 URI corresponding to the TG Member1 of the RF Site1.

SDP parameters include RTP Voice media in accordance with a radio system.

It should be noted that the message bodies of steps 814-818 will change if a talkgroup PoC is allocated in the RF site for the talkgroup.

Steps 818 and 820 show SIP: 200 OK response from the terminating SU PoC clients of RF Site2. In one embodiment, it can be assumed that terminating RF Site2 will identify excessive INVITEs for a same group call and will act in accordance to a Trunking mode policy. The trunking policy can indicate (i) for the Transmission Trunking mode, the RFSite2 responds on behalf of only one (SU2 or SU3) PoC client with SIP: 200 OK to the PoC/SIP server; (ii) for the P25 Message Trunking mode, the RFSite2 can respond on behalf of each SU PoC client with SIP: 200 OK messages to the PoC/SIP server.

To elaborate, excessive SIP: INVITE message handling can be managed by terminating RF sites. In one embodiment, two modes can be established to manage excessive INVITES, which are a transmission trunking mode and a message trunking mode.

In the transmission trunking mode, an RF site can be configured to accept only one of a set of multiple INVITEs. This is done to assure that the RF site will receive the RTP voice associated with this call (and will broadcast it over an RF TCH for the benefit of all SUs that monitor this talkgroup). Accepting one invite is sufficient since the call will be released (SIP: BYE) immediately after the RTP stream ends, as no subsequent floor control is required with the transmission trunking mode.

In the message trunking mode, an RF site can accept all the INVITEs, but will broadcast over only one RF TCH for the benefit of all SUs that monitor the corresponding talkgroup. This mode can assure fair floor control contention for all SUs served by the RF site that might want to reply on the call. It can be assumed in one embodiment that RF site WAN links are wide enough to carry all RTP streams sent by the PoC server. In architectures where this assumption is not true, corrective adjustments can be made.

Steps 822 and 824 shows a SIP: ACK message from the PoC/SIP server to the terminating SU2 and SU3 PoC clients of RF Site2. Depending on the RF Site2 behavior in steps 818 and 820, the RF Site2 may receive either one or multiple ACK from the PoC/SIP server.

Step 826 shows a SIP: 200 OK responses from the PoC/SIP Server to originating RFSite1 SU1 PoC client. The originating RFSite1 can receive a response from the SIP/PoC Server.

Step 828 shows a SIP: ACK message from the originating RF Site1 SU1 PoC client to the PoC/SIP Server. The RFSite1 can acknowledge to the SIP: 200 OK Response.

Step 830 shows a SIP: ACK from the PoC/SIP server to the RFSite2.

Step 832 shows a GRP_V_CH_GRANT message from RFSite1 to originating TG Member1. In one embodiment, as soon as the PoC session is established, the RF Site 1 can grant originating talkgroup Member1 with traffic resources for sending GRP_V_CH_GRANT on the control channel.

Step 834 shows a GRP_V_CH_GRANT message from RFSite2 to terminating TG Members 2 and 3. In one embodiment, as soon as the PoC session is established, the terminating RF Site2 can grant participating talkgroup members with traffic resources by sending GRP_V_CH_GRANT messages on the control channel with a source address set to the WUID of the TG Member 1. It can be assumed that all subscriber units belong to same registration area. Thus the RFSite2 can extract WUID of the TG Member1 from its SUID received in the SIP: INVITE message (that was received previously).

Step 836 shows a TBCP/RTP transport path between RFSite1 and PoC Server. In one embodiment, all TBCP messages and RTP Media packets go between the RFSite1 SU1 client and the PoC server controlled by the PoC Server's media-floor control entity until the PoC session is released.

Step 838 shows a TBCP/RTP transport path between RFSite2 and PoC Server. In one embodiment, all TBCP messages and RTP Media packets go between the RFSite2 SU2 and SU3 clients and the PoC server are controlled by the PoC Server's media-floor control entity until the PoC session is released.

Figure 9:
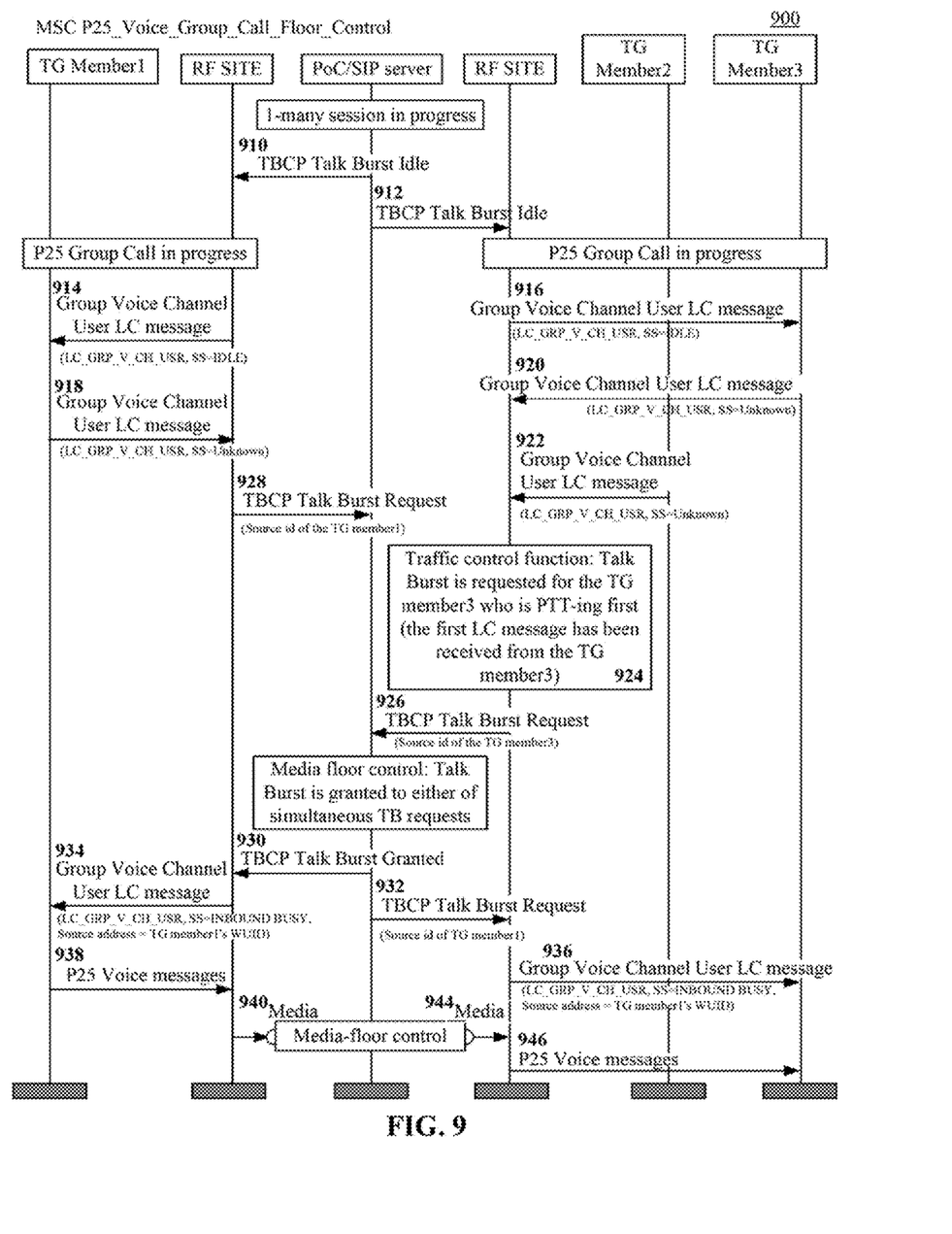
FIG. 9 shows a scenario for a voice group call in progress with a modification of RTCP floor control messages in accordance with an embodiment.

FIG. 9 shows a scenario 900 for a voice group call in progress with a modification of RTCP floor control messages in accordance with an embodiment. That is, scenario 900 illustrates an embodiment of the disclosure having hierarchical two stage floor control of ongoing group voice half-duplex call over PoC Network. In the scenario 900, talk permissions are requested simultaneously by multiple members of the talk group. All media control messages can be sent to or received from the call participants via the ports that have been bound to the media-floor control entity for the speech media type during the call setup.

There can be two methods for talk group members to continue the assigned call during message trunking hangtime: Direct or Control Channel methods. In one embodiment, The RFSite(s) should be capable to support either method during any given message trunked call assignment. The scenario 900 below shows Direct method where P25 TG members of the ongoing group voice call sending inbound talk permission requests over allocated traffic channel.

In one embodiment, if a P25 unit applies Control Channel method for group call continuation it should return to the P25 Control channel and issue group call request with PTT pressing. From the perspective of corresponding RFSite, the PoC group session is in progress, thus the PERS will send TBCP Talk Burst Request on behalf of this P25 talk group member over PoC User Plane. If talk is permitted for this request the PERS should send GRP_V_CH_GRANT on the control channel which triggers the permitted talkgroup member to return to associated traffic channel. From the P25 network perspective there is an option to indicate P25 site's preferred call continuation method using the RFSS Status Broadcast message containing a bit to indicate the site's preferred continuation method.

Steps 910 and 912 show a TBCP Talk Burst Idle message from the PoC server to the talkgroup dummy user PoC clients of RFSite1 and RFSite2. On reception of TCBP Talk Burst Idle message from the PoC Server the RFSite1 and RFSite2 can detect that nobody has talk permission for the moment in the ongoing talkgroup 1-many session.

Steps 914 and 916 show a LC_GRP_V_CH_USR message from RFSite1 and RFSite2 to the TG members. Considering nobody is permitted to talk within the group session, RFSite1 and RFSite2 can periodically send outbound LC_GRP_V_CH_USR including Status symbol="IDLE" over traffic channels allocated to this group call in their sites. The Status symbol indicates to the talk group members that traffic channel is available for transmissions.

In step 918, an LC_GRP_V_CH_USR message can be sent from the TG Member1 to the RFSite1. The TG Member1 can be pressing PTT to begin talking in the group call. This is resulted in sending of inbound LC_GRP_V_CH_USR message to the RFSite1 on allocated traffic channel.

In steps 920, 922 LC_GRP_V_CH_USR messages can be sent from the TG Members 2 and 3 to the RFSite2. The TG Members2 and 3 can be simultaneously pressing PTT to begin talking in the group call. This is resulted in sequential sending of inbound LC_GRP_V_CH_USR messages to the RFSite2 on allocated traffic channel.

In step 924, a talk burst can be requested for the TG Member3 as the first PTT-ing user. In one embodiment, within an RFSite there can be a trunked traffic channel access procedure applied to minimize traffic channel collisions between different group members. In scenario 900, the first LC_GRP_V_CH_USR message is received from the TG Member3, thus the RFSite2 considers it as the first PTT-ing and will request talk burst permission on behalf of this SU.

In step 926, a TBCP Talk_Burst_Request message can be sent from the talk group dummy user PoC client of RFSite2 to the PoC server. The RFSite2 can send Talk Burst Request message to the PoC Server on behalf of the TG Member3. For the purpose of determining of the PTT-ing user, TBCP Talk Burst request message can be expanded with an additional field to introduce the Source Address of the SU. As shown, the TBCP Talk Burst Request sent from the RFSite2 to the PoC server should carry a Source address of the TG Member3 requesting PTT.

In step 928, TBCP Talk_Burst_Request message can be sent from the talkgroup dummy user PoC client of PERS 1 to the PoC server. On reception of LC_GRP_V_CH_USR message from the TG Member1 the TG PoC client of RFSite1 on behalf of this unit can send Talk Burst Request for audio transmission to the PoC Server. This message should carry Source address of the TG Member1 requesting PTT.

In step 930, TBCP Talk Burst Granted message can be sent from the PoC server to the talkgroup PoC client of RFSite1. If Talk Bursts are simultaneously requested from both RFSite1 and RFSite2 there will be PoC Server responsibility to grant talk permission to either of the PoC TG-site clients. In scenario 900, the PoC server grants the originating talkgroup PoC client of the RFSite1 with talk permission in this group session.

In step 932, TBCP Talk Burst Taken message can be sent from the PoC server to the talkgroup PoC client of RFSite2. The terminating talkgroup client of the RFSite2 can be notified about Talk Burst taken by other user. For the purpose of determining of the PTT-ing P25 user, the TBCP Talk Burst Taken message can be expanded with an additional field to introduce the Source Address of the SU.

In step 934, LC_V_CH_USR message can be sent from the RFSite1 to the TG Member1. Upon reception of the Talk Burst Granted message from the PoC Server the RFSite1 can permit requesting TG Member1 to talk by periodical distribution of the outbound LC_V_CH_USR messages on the traffic channel allocated for this group call. This message contains talker's Source Address=TG Member1's WUID and Status Symbol="INBOUND BUSY".

In step 936, LC_V_CH_USR message can be sent from the RFSite2 to the TG Members2 and 3. Upon reception of the Talk Burst Taken message from the PoC server the RFSite2 can begin periodical sending of the outbound LC_V_CH_USR messages towards the talk group's members (in our example they are TG Members2 and 3) on the allocated traffic channel. This message contains talker's Source Address=TG Member1's WUID obtained from the Talk Burst Taken message and Status Symbol="INBOUND BUSY" that informs the users about traffic channel busy for transmission.

In step 938, voice messages can be sent from the TG Member1 to the RFSite1. The RFSite1 can convey voice frames received from the talking TG Member1 within RTP payload.

In step 940, media packets can be conveyed from the talkgroup PoC client of the RFSite1 to the PoC server. The originating talkgroup PoC client of the RFSite1 can send inbound media packets conveying voice frames towards PoC server thru the RTP transport path.

In step 944, media packets can be conveyed from the PoC server to the talkgroup PoC client of the RFSite2. The terminating talkgroup PoC client of the RFSite2 can receive outbound voice media packets sent by the PoC server via the RTP path associated with this client for current 1-many group session.

In step 946, voice messages can be conveyed from the RFSite2 to the TG Members2 and 3. In the RFSite2 the outbound media packets are converted into the voice frames and distributed within the talk group members on the allocated traffic channel.

The flowchart, block, and pseudo code diagrams in the FIGS. 1-9 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for communicating via radio devices over a radio network comprising;
registering at least one subscriber unit (SU) to a radio frequency (RF) site for radio services, wherein the at least one SU wirelessly communicates with the RF site over a common air interface (CAI);
for each registered subscriber unit, activating a SU push to talk over cellular (PoC) client at the RF site, wherein communications are mapped at the RF site between each registered SU and a corresponding SU PoC client at the RF site, such that communications and commands are conveyed from the SU to the corresponding SU PoC client at the RF site and such that communications and commands are conveyed from the SU PoC client at the RF site to the corresponding SU; and communicatively linking each SU PoC client at the RF site to a remotely located PoC server using a PoC interface, where the SU PoC client is a communication endpoint of the PoC server, wherein radio communications to and from the SU are routed through the SU PoC client and through the PoC server.

2. The method of claim 1, wherein communication components for radio communications to and from the SU are compliant with Association of Public-Safety Communications Officials-International (APCO) Project 25 specifications.

3. The method of claim 1, further comprising:

establishing a communication core for the radio services, which comprises the PoC server and a resource manager, wherein said communication core is a radio frequency sub-system (RFSS), wherein the RFSS is a smallest portion of a radio communication infrastructure bounded by standard Association of Public-Safety Communications Officials-International (APCO) interfaces, wherein the resource manager maintains and enforces resource policies for the radio services; and communicating between the PoC server and the resource manager to ensure communication services involving the PoC server are conducted in accordance with the resource policies of the resource manager.

4. The method of claim 1, wherein the radio services are trunked radio services, wherein communications between the RF site and the SU occur over a control channel and over a traffic channel.

5. The method of claim 4, wherein the control channel communicates commands between the SU and the RF Site, and where control channel communications are directed from the RF site to a resource manager, which is a component of a radio frequency sub-system (RFSS), as is the PoC server.

6. The method of claim 1, where SU is able to communicatively link to mobile telephony devices through the PoC server, wherein the mobile telephony devices are each a communication endpoint of the PoC server of PoC server maintained communication session that includes the SU.

7. The method of claim 1, further comprising:

activating at least one talkgroup PoC client at the RF site, wherein the talkgroup PoC client is a communication endpoint of the PoC server;

routing talkgroup communications through the talkgroup PoC client;

linking the SU PoC client to the talkgroup PoC client, where the SU corresponding to the SU PoC client is a member of the talkgroup, where talkgroup communications are also routed between the talkgroup PoC client and the corresponding SU.

8. The method of claim 1, further comprising:

establishing a PoC interworking gateway (IW-GW) within the RF Site, wherein the SU PoC client is created by and established within the PoC IW-GW;

communicatively linking the PoC IW-GW to traffic channels of the RF Site, wherein said SU communicates with the RF site over the common air interface (CAI) via one of the talkgroup channels; and communicatively linking the PoC IW-GW to a site controller (SC), wherein the SC is linked to a control channel, wherein said SU communicates with the RF gateway over the common air interface via the control channel.

9. An apparatus comprising:

a radio frequency (RF) site comprising:

a processor that is configured to:

register at least one subscriber unit (SU) to the RF site for radio services, wherein the at least one SU wirelessly communicates with the RF site over a common air interface (CAI);

for each registered subscriber unit, activate a SU push to talk over cellular (PoC) client at the RF site, wherein communications are mapped at the RF site between each registered SU and a corresponding SU PoC client, such that communications and commands are conveyed from the SU to the corresponding SU PoC client and such that communications and commands are conveyed from the SU PoC client to the corresponding SU; and communicatively link each SU PoC client at the RF site to a remotely located PoC server using a PoC interface, where the SU PoC client is a communication endpoint of the PoC server, wherein radio communications to and from the SU are routed through the SU PoC client and through the PoC server.

10. The apparatus of claim 9, further comprising communication components for radio communications to and from the SU, wherein the communication components are compliant with Association of Public-Safety Communications Officials-International (APCO) Project 25 specifications.

11. The apparatus of claim 9, further comprising a resource manager, wherein the RF site and resource manager each is part of a radio frequency sub-system (RFSS), wherein the RFSS is a smallest portion of a radio communication infrastructure bounded by standard Association of Public-Safety Communications Officials-International (APCO) interfaces, wherein the resource manager maintains and enforces resource policies for the radio services, and wherein the processor is configured to:

engage in communications with the resource manager to ensure communication services involving the PoC server are conducted in accordance with the resource policies of the resource manager.

12. The apparatus of claim 9, wherein the radio services are trunked radio services and wherein the RF site is configured to communicate with the SU over a control channel and over a traffic channel.

13. The apparatus of claim 12, further comprising a resource manager and wherein the RF site is configured to communicate control channel commands to the SU via the control channel and to direct control channel communications to the resource manager.

14. The apparatus of claim 9, further comprising a PoC interworking gateway (IW-GW), wherein the RF site comprises the PoC interworking gateway (IW-GW);

wherein the processor is configured to communicate with the PoC IW-GW;

wherein the SU PoC client is created by and established within the PoC IW-GW;

wherein the PoC IW-GW is configured to communicatively link to traffic channels of the RF site and wherein the RF site communicates with the SU over the common air interface (CAI) via one of the talkgroup channels;

wherein the PoC IW-GW is configured to communicatively link to a site controller (SC) and wherein the SC is linked to a control channel; and wherein the RF site is configured to communicate with the SU over the common air interface via the control channel.

15. The apparatus of claim 9, wherein the processor is configured to enable the SU to communicatively link to mobile telephony devices through the PoC server, wherein the mobile telephony devices are each a communication endpoint of a communication session maintained by the PoC server and that includes the SU.

16. The apparatus of claim 9, wherein the processor is configured to:
   route talkgroup communications through a talkgroup PoC client at the RF site to the PoC server; and
   link the SU PoC client to the talkgroup PoC client, where the SU corresponding to the SU PoC client is a member of the talkgroup and where talkgroup communications are also routed between the talkgroup PoC client and the corresponding SU.

* * * * *

UNITED STATES PATENT AND TRADEMARK OFFICE
CERTIFICATE OF CORRECTION

| | | |
|---|---|---|
| PATENT NO. | : 8,929,938 B2 | Page 1 of 1 |
| APPLICATION NO. | : 13/190768 | |
| DATED | : January 6, 2015 | |
| INVENTOR(S) | : Eitan Koren et al. | |

It is certified that error appears in the above-identified patent and that said Letters Patent is hereby corrected as shown below:

ON THE TITLE PAGE:

Item 75, under "Inventors", in Column 1, Line 1, delete "Raanana" and insert -- Ra'anana --, therefor.

IN THE SPECIFICATION:

In Column 6, Lines 62-63, delete "telephony network" and insert -- telephone network --, therefor.

In Column 7, Line 9, delete "site 120" and insert -- site 120. --, therefor.

In Column 9, Line 19, delete "units (SU)" and insert -- units (SUs) --, therefor.

In Column 10, Line 21, delete "(over P-R2 interface)" and insert -- (over P-R2 interface). --, therefor.

In Column 11, Line 58, delete "PoC/SiP" and insert -- PoC/SIP --, therefor.

In Column 13, Line 7, delete "INVITES" and insert -- INVITEs --, therefor.

In Column 13, Line 39, delete "INVITES," and insert -- INVITEs, --, therefor.

IN THE CLAIMS:

In Claim 1, Column 16, Line 57, delete "comprising;" and insert -- comprising: --, therefor.

Signed and Sealed this
Twenty-eighth Day of June, 2016

Michelle K. Lee
*Director of the United States Patent and Trademark Office*